United States Patent [19]
Fujioka et al.

[11] Patent Number: 4,997,073
[45] Date of Patent: *Mar. 5, 1991

[54] CLUTCH DRUM

[75] Inventors: Kazuyoshi Fujioka, Atsugi; Kaoru Shori, Fuji, both of Japan

[73] Assignee: Nissan Motor Co., Ltd., Kanagawa, Japan

[*] Notice: The portion of the term of this patent subsequent to Mar. 21, 2006 has been disclaimed.

[21] Appl. No.: 323,884

[22] Filed: Mar. 15, 1989

Related U.S. Application Data

[62] Division of Ser. No. 502,757, Jun. 9, 1983, Pat. No. 4,813,522.

[30] Foreign Application Priority Data

Jun. 21, 1982 [JP] Japan ................... 57-105396

[51] Int. Cl.5 .................................... F16D 13/62
[52] U.S. Cl. ...................... 192/70.2; 72/348; 192/109 R
[58] Field of Search ............. 192/70.2, 85 AA, 109 R; 72/326, 348; 403/326, 359, 375

[56] References Cited

U.S. PATENT DOCUMENTS

| | | | |
|---|---|---|---|
| 2,729,110 | 1/1956 | Killian et al. | 74/449 X |
| 3,631,947 | 1/1972 | Laing | 74/449 X |
| 3,765,514 | 10/1973 | Harrison | 192/70.2 X |
| 3,922,932 | 12/1975 | Maurice et al. | 74/449 X |
| 4,014,619 | 3/1977 | Good et al. | 192/70.2 X |
| 4,082,171 | 4/1978 | Lalin et al. | 192/70.2 |
| 4,813,522 | 3/1989 | Fujioka et al. | 403/375 X |

FOREIGN PATENT DOCUMENTS 1442254 7/1976 United Kingdom ............... 192/70.2

*Primary Examiner*—Rodney H. Bonck
*Attorney, Agent, or Firm*—Lane, Aitken & McCann

[57] ABSTRACT

A clutch drum includes a cylindrical drum body having a spline portion consisting of plural extruded angles and extruded channels formed by pressing, and plural pressed-out portions formed at the spline portion, one side wall of the pressed-out portions having a continuous shape without any rupture, the other side wall of the pressed-out portions being formed by half blanking of the clutch drum body so as to stop a snap ring threat.

5 Claims, 4 Drawing Sheets

CLUTCH DRUM

This is a division, of application serial No. 06/502,757, filed June 9, 1983 and now U.S. Pat. No. 4,813,522.

BACKGROUND OF THE INVENTION

This invention relates to a clutch drum.

FIG. 1 shows a conventional frictional clutch for use in an automatic transmission. A press-formed clutch drum 1 has a spline portion 1a. A snap ring groove 1b is formed in each extruded angles of the spline portion 1a. A snap ring 2 is set in the snap ring grooves 1b so that plural clutch plates 3 can be prevented from moving in an axial direction as well-known.

FIGS. 2 through 4 show in detail such snap ring grooves in a conventional clutch drum. A snap rig groove 13 is formed in each extruded angle or inward protruding portion 12 in a clutch drum 11.

The snap ring grooves 13 are formed by the following steps: Two parallel cutting lines are formed in a predetermined portion of each extruded angle 12 where the snap ring groove 13 is to be formed. The distance between the two cutting lines is slightly longer than the width of the snap ring 14. The portion of the extruded angles 12 between the cutting lines is pressed out so as to form the grooves 13. The reference 15 designates such pressed-out portions. A recess resulting from the pressing-out constitutes the snap ring groove 13.

In the above-mentioned conventional clutch drum, however, the pressed-out portions 15 are partly cut off from the body of the clutch drum 11 along the cutting lines so as to be weak.

For such a reason, a thick steel plate must be used in order to avoid the rupture of the pressed-out portions 15 defining the snap ring grooves 13. In addition, a large size of special machine for carrying out the steps of forming two cutting lines and pressing out the clutch drum must be used. Also, for the same reason, it takes a long production time.

SUMMARY OF THE INVENTION

The object of this invention is to provide a clutch drum in which a clutch drum body can be strengthened.

According to this invention, there is provided a clutch drum including a cylindrical drum body having a spline portion consisting of plural extruded angles and extruded channels formed by pressing, and plural pressed-out portions formed at the spline portion, one side wall of the pressed-out portions having a continuous shape without any rupture, the other side wall of the pressed-out portions being formed by half blanking of the clutch drum body so as to stop a snap ring thereat.

DETAILED DESCRIPTION OF THE PREFERRED EMBODIMENTS

Figure 1:
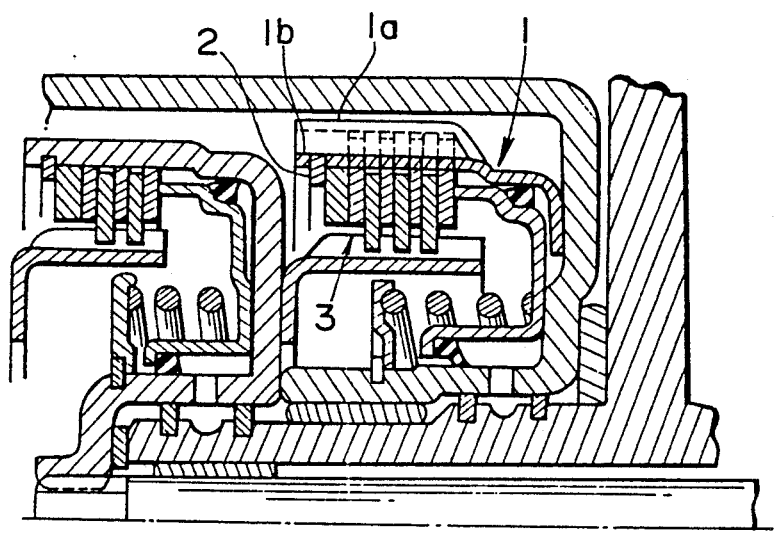
FIG. 1 is a schematic sectional view showing a portion of a conventional automatic transmission equipped with a prior art clutch drum.
Figure 2:
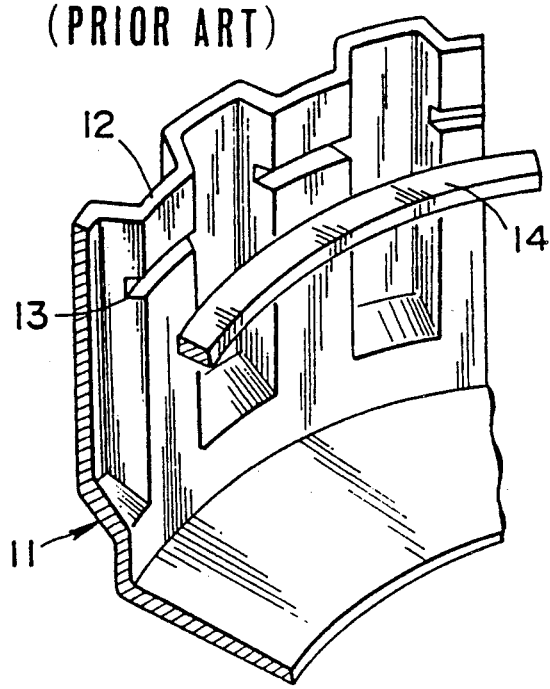
FIG. 2 is a schematic perspective view showing a part of a conventional clutch drum.
Figure 3:
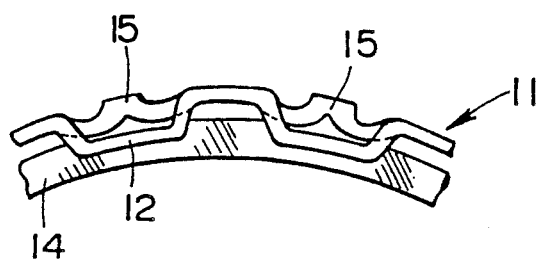
FIG. 3 is a plan view showing in an assembled condition the clutch drum shown in FIG. 2.
Figure 4:
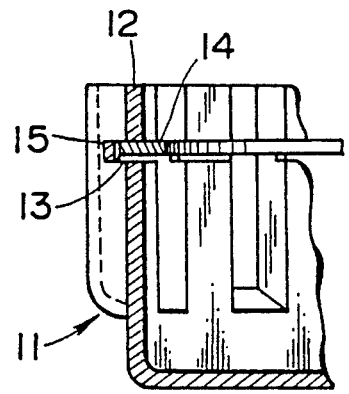
FIG. 4 is a sectional view showing the clutch drum of FIG. 3.
Figure 5:
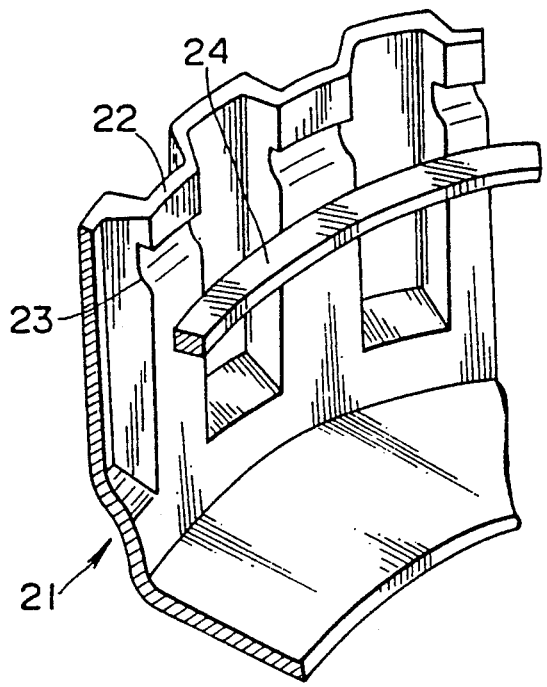
FIG. 5 is a schematic perspective view showing only an essential portion of a clutch drum according to a first embodiment of this invention in an disassembled condition.
Figure 6:
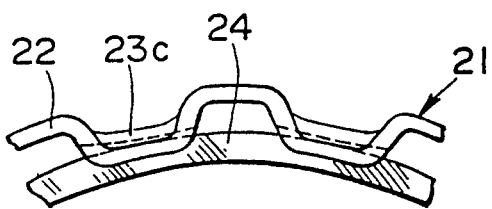
FIG. 6 is a plan view showing the clutch drum of FIG. 5 in an assembled condition.
Figure 7:
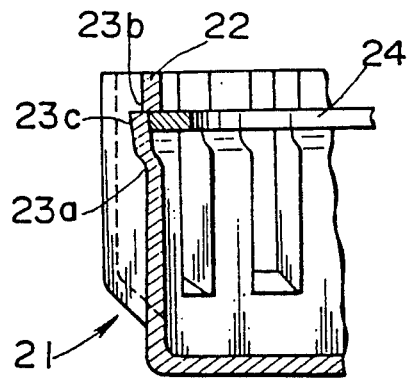
FIG. 7 is a sectional view showing the clutch drum shown in FIG. 5.

FIGS. 5, 6 and 7 show a first embodiment of this invention. A clutch drum 21 has a plurality of inward protruding portions or extruded angles 22 a trapezoid-like shape in section. A snap ring groove or channel 23 is formed in each extruded angle 22 by pressing out a portion of each extruded angle 22. One side wall 23a of the snap ring groove 23 has a continuous bulging shape so that the clutch drum 21 is not cut off thereat. As best shown in FIG. 7, the other side wall 23b is partly ruptured by half blanking of a predetermined portion of the clutch drum 21. A snap ring 24 contacts the side wall 23b when the snap ring 24 is assembled in the clutch drum 21.

The reference 23c denotes an extruded angle or pressed-out portion which constitutes the bottom portion of the snap ring groove 23.

The clutch drum 21 is remarkably strengthened at the grooves 23 because the pressed-out portion 23c can function as a rib so as to increase the strength of the extruded angle 22.

The snap ring grooves 23 of the clutch drum 21 can be pressed by a simple moving in the radius direction of a punching die (not shown). Therefore, the productivity is high. If desired, the snap ring grooves 23 can be formed by a general purpose press machine.

Figure 8:
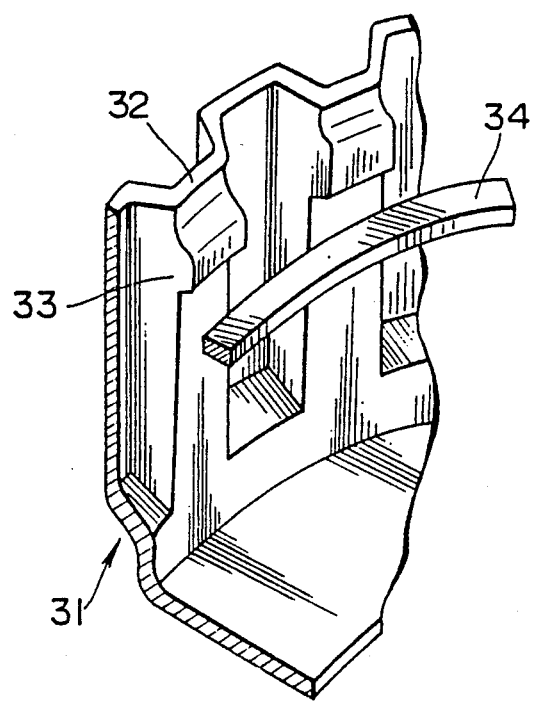
FIG. 8 is a schematic perspective view showing a clutch drum according to a second embodiment of this invention.

FIG. 8 shows a second embodiment of this invention. The extruded angles 32 of the clutch drum 31 are pressed out inwardly as designated by 33. Such pressed-out portions 33 project inwardly to form stops. One side wall of the pressed-out portions 33 is continuous and does not have any rupture. The other wall of the pressed-out portions 33 is formed by half blanking of the extruded angles 32 so as to allow support of the snap ring 34. In this embodiment, the snap ring 34 can move only in one direction (downwardly in FIG. 8).

When the pressed-out portions 33 are formed, a punching die can be arranged outside the clutch drum 41. Therefore, a small size of clutch drum can be made.

Figure 9:
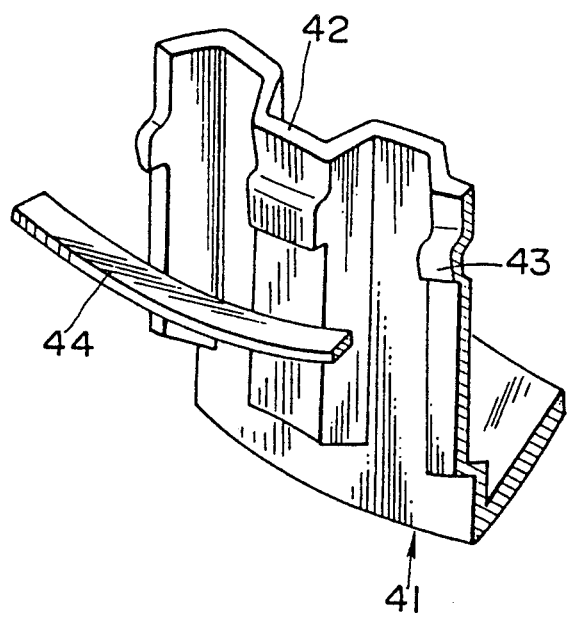
FIG. 9 is a schematic perspective view showing a clutch drum according to a third embodiment of this invention, in a disassembled condition.

FIG. 9 shows a third embodiment of this invention in which an outer side portion of a clutch drum 41 is used as a spline portion. In this embodiment, extruded channels 42 are used to stop the snap ring 44 outside the clutch drum 41.

In this embodiment, the extruded channels 42 are pressed out by bulging and half blanking thereof thereby to form pressed-out portions 43 which stop the snap ring 44.

What is claimed is:

1. A clutch drum comprising a generally cylindrical drum body having spline means formed by a plurality of radially inward protruding portions and radially outward protruding portions with respect to a center axis of the drum body, said radially inward and outward protruding portions extending in parallel to said axis and being arranged alternately around the drum body, said drum body having a plurality of pressed-out portions arranged circumferentially along the drum body on the spline means and each of said pressed-out portions being displaced radially with respect to said center axis to form first and second side walls, said pressed-out portions adjoining unpressed portions of the spline means, said first side wall being substantially perpendicular to said axis and extending circumferentially along the drum body, said first side wall being partly ruptured from a first adjoining unpressed portion of the spline means and being partly in one piece with said first adjoining unpressed portion of the spline means, said first side wall being so displaced radially with respect to said center axis as to partly overlap with said first adjoining unpressed portion and to define an abutment for a snap ring, said abutment defined by a non-overlapped portion of said first side wall adjoining said overlapped portion of the first side wall, and said second side wall opposite the first side wall in a direction parallel to said center axis and being continuous with a second adjoining unpressed portion of the spline means without any rupture between said second side wall and said second adjoining unpressed portion.

2. A clutch drum as set forth in claim 1, wherein each pressed-out portion is formed at each of the radially inward protruding portions and displaced radially inward with respect to the center axis of the drum body thereby to form a snap ring stop inside the clutch drum body.

3. A clutch drum as set forth in claim 1, wherein each pressed-out portion is formed at each of the radially outward protruding portions and displaced radially outward with respect to the center axis of the drum body thereby to form a snap ring stop outside the clutch drum body.

4. For a clutch drum including a generally cylindrical drum body, said drum body having a spline means formed by a plurality of radially inward protruding portions and radially outward protruding portions with respect to a center axis of the drum body, said radially inward and outward protruding portions extending in parallel to said center axis and being arranged alternately around the drum body, said drum body having a plurality of pressed-out portions arranged circumferentially along the drum on the spline means to define stopping means for a snap ring, a method of forming each of said pressed-out portions comprising the steps of:

displacing a first predetermined portion of the spline means radially with respect to said center axis along a first line extending circumferentially of the drum body so as to form a first wall which is continuous with a first adjoining undeformed portion of the spline means without any rupture between said first wall and said first adjoining undeformed portion; and displacing a second predetermined portion of the spline means in the same direction as that of the displacement of said first portion along a second line which is parallel to and spaced from said first line a predetermined distance in the direction along said center axis so as to form a second wall, said second portion being displaced in such a manner that said second wall is partly ruptured from a second adjoining undeformed portion of the spline means and partly in one piece with said second adjoining undeformed portion and that said second wall is partly overlapped with said second adjoining undeformed portion.

5. For a clutch drum including a generally cylindrical drum body having spline means formed by a plurality of radially inward protruding portions and radially outward protruding portions with respect to a center axis of the drum body, said radially inward and outward protruding portions extending in parallel to said center axis and being arranged alternately around the drum body, said drum body having a plurality of pressed-out portions arranged circumferentially along the drum body on the spline means to define stopping means for a snap ring, a method of forming each of said pressed-out portions comprising the steps of:

pressing-out a first predetermined portion of the spline means radially with respect to said center axis along a first line extending circumferentially of the drum body so as to form a first wall which is continuous with a first adjoining undeformed portion of the spline means without any rupture between said first wall and said first adjoining undeformed portion; and blanking a second predetermined portion of the spline means in the same direction as that of the displacement of said first portion along a second line which is parallel to and spaced from said first line a predetermined distance in the direction along said center axis so as to form a second wall which is opposite said first wall, said second portion being blanked in such a manner that said second wall is partly ruptured from a second adjoining undeformed portion of the spline means and partly in one piece with said second adjoining undeformed portion and that said second wall is partly overlapped with said second adjoining undeformed portion.

* * * * *